S. T. Godfrey,
Plow Cleaner.
No. 91,328.   Patented June 15, 1869.
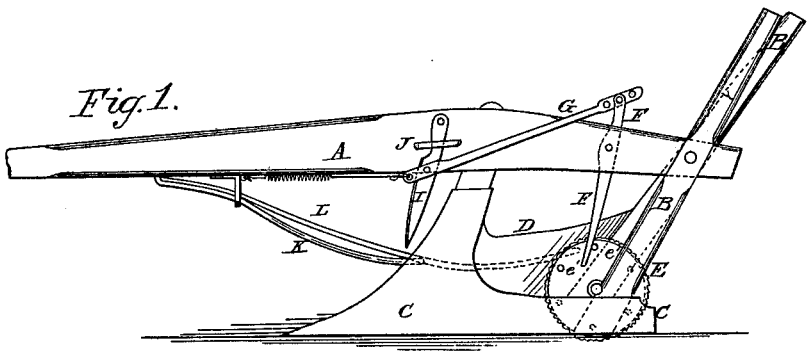
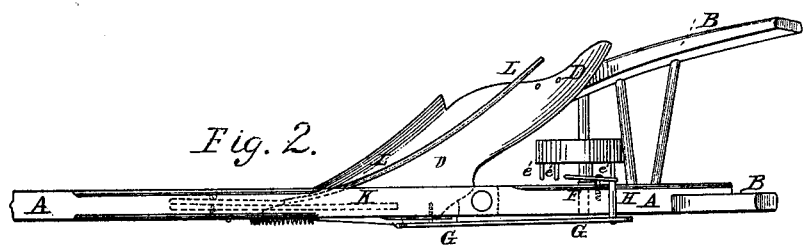
Witnesses
A. W. Almquist
Jno. H. Brooks
Inventor:
S. T. Godfrey

United States Patent Office.

S. T. GODFREY, OF SEAVILLE, NEW JERSEY.

Letters Patent No. 91,328, dated June 15, 1869.

---

IMPROVEMENT IN PLOWS.

---

The Schedule referred to in these Letters Patent and making part of the same.

---

*To all whom it may concern:*

Be it known that I, S. T. GODFREY, of Seaville, Cape May county, New Jersey, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1 is a view of the landside of my improved plow.

Figure 2 is a top view of the same.

Similar letters of reference indicate corresponding parts.

My invention has for its object to improve the construction of plows, so as to make them better adapted for plowing in sedge, sea-weed, and other similar substances; and It consists in the combination of the spring-guards, and the knife and its operating-mechanism, with the other parts of the plow, as hereinafter more fully described.

A is the beam, B are the handles, C is the landside, and D is the mould-board of the plow, about the construction of which parts there is nothing new.

E is a wheel, which is pivoted to the frame-work of the plow, in such a position that its face may bear upon the bottom of the furrow being cut.

The face of the wheel E may be corrugated, to enable it to be more surely revolved by the advance of the plow.

F is a lever, pivoted to the side of the beam A, in such a position that its lower end may be in contact with the pins e', projecting from the side of the wheel E, so that the said lever may be operated by the revolution of the wheel E.

The upper end of the lever is connected with the rear end of the connecting-bar G by the long bolt H, which passes through one or the other of the holes through the lever F, and through one or the other of the holes through the rod G.

If desired, the rod G may be bent, so that its rear end may come in contact with and be directly attached to the lever F.

The forward end of the bar or rod G is pivoted to the knife or cutter I, the upper end of which is pivoted to the side of the beam A, and which is kept close to said beam by the keeper J, through which it passes.

By this construction, a vibrating movement will be given to the knife I by the advance of the plow, so as to either cut through the weeds, or separate them, to open a way for the coulter of the plow.

K is a spring-guard, the forward end of which is attached to the under side of the forward part of the plow-beam A, and the rear or free end of which extends back to, or nearly to, the coulter, so as to press the sedge or sea-weed down, and hold them, while being operated upon by the knife I.

L is a spring-guard, the forward end of which is rigidly attached to the plow-beam A.

The spring-guard L extends back nearly to the coulter of the plow, and is then bent or curved, so as to nearly follow the curve of the mould-board, being at a distance from said mould-board about equal to the thickness of the furrow-slice to be raised and turned, so that the said guide or guard may hold the sedge, sea-weed, or other substance, down upon the furrow-slice, until it is turned over, so as to insure its being thoroughly covered by said furrow.

Having thus described my invention,

What I claim as new, and desire to secure by Letters Patent, is—

1. The combination of the pivoted knife I, connecting-rod G, lever F, and wheel E, having pins, e', projecting from its side, with the plow A B C D, substantially in the manner herein shown and described, and for the purpose set forth.

2. The combination of the spring-guide K with the plow A B C D, substantially as herein shown and described, and for the purposes set forth.

The above specification of my invention signed by me, this 16th day of March, 1869.

S. T. GODFREY.

Witnesses:
FRANK BLOCKLEY,
JAMES T. GRAHAM.